(12) United States Patent
Munzinger et al.

(10) Patent No.: US 11,891,507 B2
(45) Date of Patent: Feb. 6, 2024

(54) THERMOSETTING EPOXY RESIN COMPOSITION HAVING LOW CURING TEMPERATURE AND GOOD STORAGE STABILITY

(71) Applicant: SIKA TECHNOLOGY AG, Baar (CH)

(72) Inventors: Noah Munzinger, Zürich (CH); Dominique Gallo, Otelfingen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 17/287,067

(22) PCT Filed: Dec. 23, 2019

(86) PCT No.: PCT/EP2019/086914
§ 371 (c)(1),
(2) Date: Apr. 20, 2021

(87) PCT Pub. No.: WO2020/141130
PCT Pub. Date: Jul. 9, 2020

(65) Prior Publication Data
US 2021/0355316 A1    Nov. 18, 2021

(30) Foreign Application Priority Data
Jan. 3, 2019 (EP) .................................. 19150161

(51) Int. Cl.
| | | |
|---|---|---|
| *C08L 63/04* | (2006.01) | |
| *C08G 59/40* | (2006.01) | |
| *C09J 7/35* | (2018.01) | |
| *C08F 136/06* | (2006.01) | |
| *C08G 18/75* | (2006.01) | |
| *C08G 59/24* | (2006.01) | |
| *C08G 59/46* | (2006.01) | |
| *C08L 71/02* | (2006.01) | |
| *C08L 75/04* | (2006.01) | |
| *C09J 163/04* | (2006.01) | |

(52) U.S. Cl.
CPC ............ *C08L 63/04* (2013.01); *C08F 136/06* (2013.01); *C08G 18/755* (2013.01); *C08G 59/245* (2013.01); *C08G 59/4021* (2013.01); *C08G 59/4035* (2013.01); *C08G 59/46* (2013.01); *C08L 71/02* (2013.01); *C08L 75/04* (2013.01); *C09J 7/35* (2018.01); *C09J 163/04* (2013.01); *C08L 2205/03* (2013.01); *C09J 2463/00* (2013.01)

(58) Field of Classification Search
None
See application file for complete search history.

(56) References Cited

U.S. PATENT DOCUMENTS

| | | | | |
|---|---|---|---|---|
| 2011/0011533 | A1* | 1/2011 | Golden | ............... C08G 59/1466 156/330 |
| 2015/0111035 | A1* | 4/2015 | Motomura | .............. C09J 163/00 523/400 |
| 2015/0344649 | A1* | 12/2015 | Sequeira | .................. C08L 63/00 523/400 |
| 2019/0002626 | A1* | 1/2019 | Kramer | .................. C08G 18/12 |

FOREIGN PATENT DOCUMENTS

| | | |
|---|---|---|
| JP | 2016-130287 A | 7/2016 |
| WO | 2009/063043 A1 | 5/2009 |
| WO | 2016/159224 A1 | 10/2016 |

OTHER PUBLICATIONS

Jun. 16, 2021 International Preliminary Report on Patentability issued in International Patent Application No. PCT/EP2019/086914.

Jan. 27, 2020 International Search Report issued in International Patent Application No. PCT/EP2019/086914.

* cited by examiner

*Primary Examiner* — Megan McCulley
(74) *Attorney, Agent, or Firm* — Oliff PLC

(57) ABSTRACT

A thermosetting epoxy resin composition including, as curing agent, a dihydrazide selected from the group consisting of glutaric dihydrazide, adipic dihydrazide and pimelic dihydrazide, in combination with a specific urea accelerator, which features good storage stability and a low curing temperature. The epoxy resin composition is especially suitable for use as bodywork adhesive.

14 Claims, No Drawings

THERMOSETTING EPOXY RESIN COMPOSITION HAVING LOW CURING TEMPERATURE AND GOOD STORAGE STABILITY

TECHNICAL FIELD

The invention relates to the field of thermosetting epoxy resin compositions, especially for use as bodywork adhesive.

STATE OF THE ART

Thermosetting epoxy resin compositions have long been known. Efforts have already been made for some time to remedy or at least significantly reduce the great disadvantage of epoxy resin compositions, namely their brittleness, the effect of which is that the cured epoxy resin composition cracks or is destroyed under impact stress. Attempts have already been made to do this by the addition of impact modifiers or by chemical modification of epoxy resins.

An important field of use of thermosetting epoxy resin compositions is in motor vehicle construction, especially in bonding or the foam-filling of voids in the bodywork. In both cases, after the application of the epoxy resin composition, the bodywork is heated in the cathodic electrocoating oven, as a result of which the thermosetting epoxy resin composition is cured and optionally foamed.

In order that rapid curing is possible, accelerators may be used alongside heat-activatable curing agents for epoxy resins. Examples of known categories of accelerators include latent imidazoles and amine-boron trifluoride complexes.

However, efforts are currently under way in the market to lower the temperature of the cathodic electrocoating ovens. Thus, there is a great need on the market for thermosetting epoxy resin compositions that cure even at relatively low temperatures, i.e. at a temperature of 130 to 140° C., even after a short time, typically 10 to 15 minutes. If, for example, aromatic ureas that are much more reactive owing to their structure are used for the purpose, this leads to major problems in the storage stability of the thermosetting epoxy resin compositions. There is therefore a need for thermosetting epoxy resin compositions which on the one hand cure at lower temperatures but have sufficient storage stability.

SUMMARY OF THE INVENTION

It is therefore an object of the present invention to provide thermosetting epoxy resin compositions which on the one hand have good storage stability at room temperature and on the other hand have rapid curing at temperatures of 130° C. to 140° C.

This object was surprisingly achieved by a thermosetting epoxy resin composition as claimed in claim 1. This epoxy resin composition has particularly good usability as a one-component thermosetting adhesive, especially as a thermosetting one-component bodywork adhesive in motor vehicle construction.

Further aspects of the invention are the subject of further independent claims. Particularly preferred embodiments of the invention are the subject of the dependent claims.

Ways of Executing the Invention

The present invention relates to one-component thermosetting epoxy resin compositions comprising a) at least one epoxy resin A having an average of more than one epoxy group per molecule;
b) at least one curing agent B for epoxy resins, where the curing agent B is a dihydrazide selected from the group consisting of glutaric dihydrazide, adipic dihydrazide and pimelic dihydrazide, preferably adipic dihydrazide; and
c) at least one accelerator C of the formula (Ia) or (Ib)

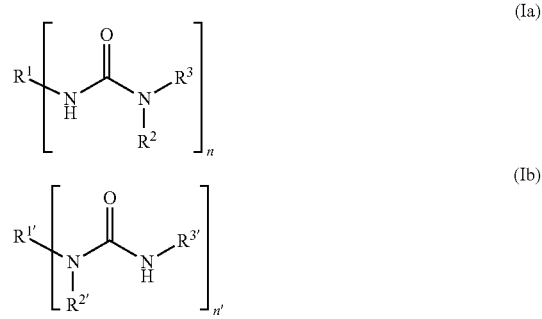

where $R^1$ is H or an n-valent aliphatic, cycloaliphatic or araliphatic radical; $R^2$ and $R^3$ are
either
each independently an alkyl group or aralkyl group;
or
together are a divalent aliphatic radical which has 3 to 20 carbon atoms and is part of an optionally substituted heterocyclic ring having 5 to 8, preferably 6, ring atoms;

$R^{1'}$ is an n'-valent aliphatic, cycloaliphatic or araliphatic radical;
$R^{2'}$ is an alkyl group or aralkyl group or alkylene group;
$R^{3'}$ is independently H or an alkyl group or aralkyl group; and
n and n' each have a value of 1 to 4, especially 1 or 2.

In this document, the use of the term "independently" in connection with substituents, radicals or groups should be interpreted such that the substituents, radicals or groups having the same designation in the same molecule may occur simultaneously with different meanings.

The prefix "poly" in substance names such as "polyol", "polyisocyanate", "polyether" or "polyamine" in the present document indicates that the respective substance formally contains more than one of the functional group that occurs in its name per molecule.

In the present document, "molecular weight" is understood to mean the molar mass (in grams per mole) of a molecule. "Average molecular weight" is understood to mean the number-average molecular weight $M_n$ of an oligomeric or polymeric mixture of molecules, which is typically determined by means of GPC against polystyrene as standard.

A "primary hydroxyl group" refers to an OH group bonded to a carbon atom having two hydrogens.

In the present document, the term "primary amino group" refers to an $NH_2$ group bonded to one organic radical, while the term "secondary amino group" refers to an NH group bonded to two organic radicals which may also together be part of a ring. Accordingly, an amine having one primary amino group is referred to as "primary amine", one having a secondary amino group correspondingly as "secondary amine", and one having a tertiary amino group as "tertiary amine".

In the present document, "room temperature" refers to a temperature of 23° C.

The epoxy resin A having an average of more than one epoxy group per molecule is preferably a liquid epoxy resin or a solid epoxy resin. The term "solid epoxy resin" is very well known to a person skilled in the art of epoxies and is used in contrast to "liquid epoxy resins". The glass transition temperature of solid resins is above room temperature, meaning that they can be comminuted at room temperature to give free-flowing powders.

Preferred epoxy resins have the formula (II)

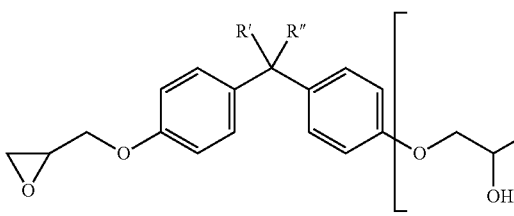

(II)

The substituents R' and R" here are independently either H or CH$_3$.

In solid epoxy resins, the index s has a value of >1.5, especially of 2 to 12.

Such solid epoxy resins are commercially available, for example from Dow or Huntsman or Hexion.

Compounds of the formula (II) having an index s of 1 to 1.5 are referred to as semisolid epoxy resins by the person skilled in the art. For the present invention here, they are likewise considered to be solid resins. However, preferred solid epoxy resins are epoxy resins in the narrower sense, i.e. where the index s has a value of >1.5.

In liquid epoxy resins, the index s has a value of less than 1. Preferably, s has a value of less than 0.2.

Preference is thus given to diglycidyl ethers of bisphenol A (DGEBA), of bisphenol F, and of bisphenol NF. Such liquid resins are available, for example, as Araldite® GY 250, Araldite® PY 304, Araldite® GY 282 (Huntsman) or D.E.R.™ 331 or D.E.R.™ 330 (Dow) or Epikote 828 (Hexion).

Further suitable epoxy resins A are what are called epoxy novolaks. These especially have the following formula:

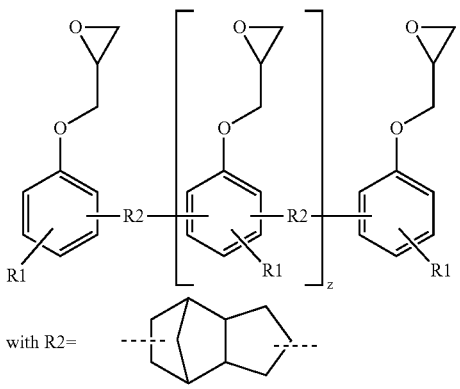

or CH$_2$, R1=H or methyl and z=0 to 7.

More particularly, these are phenol or cresol epoxy novolaks (R2=CH$_2$).

Such epoxy resins are commercially available under the EPN or ECN and Tactix® trade names from Huntsman or from the D.E.N.™ product series from Dow Chemical.

Preferably, the epoxy resin A is a liquid epoxy resin of the formula (II).

In a particularly preferred embodiment, the thermosetting epoxy resin composition contains both at least one liquid epoxy resin of the formula (II) with s<1, especially less than 0.2, and at least one solid epoxy resin of the formula (II) with s>1.5, especially from 2 to 12.

The proportion of the epoxy resin A is preferably 10-60% by weight, especially 30-50% by weight, based on the total weight of the epoxy resin composition.

It is further advantageous when 50-100% by weight, especially 80-100% by weight, of the epoxy resin A is an aforementioned liquid epoxy resin.

It is further advantageous when 0-30% by weight, especially 0-20% by weight, more preferably 5-15% by weight, of the epoxy resin A is an aforementioned solid epoxy resin.

The composition of the invention further comprises, as curing agent B, a dihydrazide selected from the group consisting of glutaric dihydrazide, adipic dihydrazide and pimelic dihydrazide. Preference is given to adipic dihydrazide.

The ratio of the proportion of epoxy groups of the epoxy resin A in mol/proportion of dihydrazide in mol is preferably 3-5, especially 3.5-4.5. This is advantageous in that high values for the mechanical properties of the cured composition, especially for modulus of elasticity and tensile strength, are obtained within this range.

The dihydrazide preferably has a median particle size D$_{50}$ of ≤100 μm, 50 μm, 0.5-50 μm, 1-50 μm, 1-40 μm, especially 1-20 μm, preferably 2-20 μm, especially preferably 2-15 μm.

It has been found that, surprisingly, this leads to an improvement of adhesion and to an improvement in impact peel strength in the compositions of the invention. This is apparent, for example, in table 2 in the comparison of E1 and E4-E8 on account of better lap shear strengths.

The term "median particle size" relates here to the D$_{50}$ of the cumulative volume distribution curve at which 50% by volume of the particles have a diameter smaller than the value. The median particle size or the D$_{50}$ is determined by laser diffractometry in the present invention.

In the present document, for example, D$_{10}$, D$_{50}$, D$_{90}$ and D$_{98}$ refer to those diameters at which, respectively, 10% by volume, 50% by volume ("median particle size"), 90% by volume and 98% by volume of the particles have a smaller diameter, determined by laser diffractometry.

It is further advantageous when the thermosetting epoxy resin composition includes a minimum amount of dicyandiamide. If the epoxy resin composition includes dicyandiamide, the weight ratio of dihydrazide to dicyandiamide is ≥0.5, ≥0.75, ≥1, ≥2, ≥5, especially ≥10, preferably ≥50, more preferably ≥100.

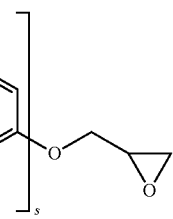

The amount of dicyandiamide is preferably less than 5% by weight, less than 3% by weight, less than 2% by weight, especially less than 1% by weight, preferably less than 0.5% by weight, more preferably less than 0.3% by weight, most preferably less than 0.1% by weight, based on the total weight of the epoxy resin composition. More preferably, the thermosetting epoxy resin composition does not include any dicyandiamide.

It is apparent, for example, in table 2 in the comparison of E1 with E3 that this leads to an improvement in storage stability, especially in the case of storage at 60° C. for one week, and higher lap shear strength and impact peel values are achieved.

It has also been found that compositions including dicyandiamide rather than the dihydrazides of the invention, whether in combination with ureas or not, do not cure at curing temperatures of 130-140° C. This is apparent, for example, in table 2 in the comparison of E1 and E2 with R4-R8.

The composition of the invention further comprises c) at least one accelerator C of the formula (Ia) or (Ib)

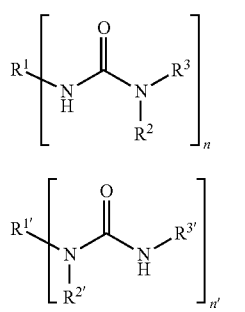

where $R^1$ is H or an n-valent aliphatic, cycloaliphatic or araliphatic radical;

$R^2$ and $R^3$ are either each independently an alkyl group or aralkyl group;

or together are a divalent aliphatic radical which has 3 to 20 carbon atoms and is part of an optionally substituted heterocyclic ring having 5 to 8, preferably 6, ring atoms;

$R^{1'}$ is an n'-valent aliphatic, cycloaliphatic or araliphatic radical;

$R^{2'}$ is an alkyl group or aralkyl group or alkylene group;

$R^{3'}$ is independently H or an alkyl group or aralkyl group; and n and n' each have a value of 1 to 4, especially 1 or 2.

What is meant by an "araliphatic radical" in this document is an aralkyl group, i.e. by an alkyl group substituted by aryl groups (cf. Römpp, CD Römpp Chemie Lexikon, Version 1, Stuttgart/New York, Georg Thieme Verlag 1995).

It is essential to the invention that, if $R^1$ is not H, $R^1$ is an n-valent aliphatic, cycloaliphatic or araliphatic radical, and not an aromatic or heteroaromatic radical. In other words, the accelerator C especially does not have the formula (I').

It is likewise essential that, if $R^{3'}$ is not H, $R^{3'}$ is not an aromatic or heteroaromatic radical, meaning that the accelerator C especially does not have the formula (I'').

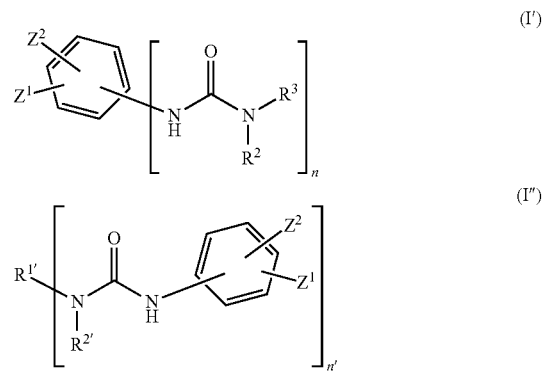

where $Z^1$ and $Z^2$ are H or any organic radical.

It has been found that accelerators having aromatic $R^1$ radicals are not storage-stable, meaning that they increase the viscosity of thermosetting epoxy resin compositions within a short time to a degree which is no longer negligible for the handling of the composition.

This is apparent, for example, in table 2 in the comparison of the storage stabilities for one week at 60° C. of E1 and E2 with R2 and R3.

$R^1$ is especially a radical of an aliphatic, cycloaliphatic or araliphatic mono-, di-, tri- or tetraisocyanate of the formula (III) after removal of the n isocyanate groups.

$R^1[NCO]_n$ (III)

This mono-, di-, tri- or tetraisocyanate of the formula (III) is either a monomeric mono-, di-, tri- or tetraisocyanate or a dimer or oligomer of one or more monomeric di- or triisocyanates, where dimers or oligomers are especially biurets, isocyanurates and uretdiones.

Suitable monomeric monoisocyanates are alkyl isocyanates, for example butyl isocyanate, pentyl isocyanate, hexyl isocyanate, octyl isocyanate, decyl isocyanate and dodecyl isocyanate, and also cyclohexyl isocyanate, methylcyclohexyl isocyanate and benzyl isocyanate.

Particularly suitable monomeric diisocyanates are butane 1,4-diisocyanate, hexamethylene diisocyanate (HDI), isophorone diisocyanate (IPDI), trimethylhexamethylene diisocyanate (TMDI), 2,5- or 2,6-bis(isocyanatomethyl)bicyclo[2.2.1]heptane, dicyclohexylmethyl diisocyanate ($H_{12}$MDI), m-tetramethylxylylene diisocyanate (TMXDI) and m-xylylene diisocyanate (XDI) and hydrogenated m-xylylene diisocyanate ($H_8$XDI).

Particularly suitable dimers or oligomers are HDI biuret, HDI isocyanurate, IPDI biuret, IPDI isocyanurate, HDI diuretdione, IPDI isocyanurate.

Such dimers or oligomers are commercially available, for example, as Desmodur N-100 (Bayer), Luxate HDB 9000 (Lyondell), Desmodur N-3300 (Bayer), Desmodur N-3600 (Bayer), Luxate HT 2000 (Lyondell), Desmodur N-3400 (Bayer), Luxate HD 100 (Lyondell), Desmodur Z 4470 (Bayer), Vestanat T 1890/100 (Hüls) or Luxate IT 1070 (Lyondell).

It is of course also possible to use suitable mixtures of the di- or triisocyanates mentioned.

$R^1$ is especially
either
an alkylene group having 4 to 10 carbon atoms, especially a hexamethylene group,
or

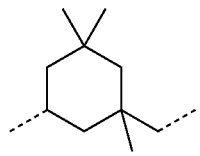

or
a biuret or an isocyanurate of an aliphatic or araliphatic diisocyanate, after removal of the isocyanate groups;
or
a xylylene group, especially a m-xylylene group.

$R^1$ is more preferably HDI, IPDI, HDI biuret and XDI, more preferably IPDI, after removal of the NCO groups.

$R^2$ and $R^3$ may together form a butylene, pentamethylene or hexamethylene group, preferably a pentamethylene group.

More preferably, $R^2$ and $R^3$ are each independently an alkyl group having 1 to 5 carbon atoms, especially each independently a methyl, ethyl or propyl group, preferably each a methyl group.

In a particularly preferred embodiment, $R^1$ is H. This is preferable in the case where $R^2$ and $R^3$ are each independently a methyl, ethyl or propyl group, preferably each a methyl group.

$R^1$ is further preferably an n-valent aliphatic, cycloaliphatic or araliphatic radical.

$R^{1'}$ is firstly especially a diamine selected from the group consisting of 1,4-diaminobutane, hexamethylenediamine, isophoronediamine, trimethylhexamethylenediamine, 2,5- or 2,6-bis(aminomethyl)bicyclo[2.2.1] heptane, dicyclohexylmethyldiamine, m-tetramethylxylylenediamine and m-xylylenediamine, hydrogenated m-xylylenediamine, ethylenediamine, propane-1,3-diamine and propane-1,2-diamine, after the removal of the two amino groups.

$R^{2'}$ is firstly especially a $C_1$-$C_{10}$-alkyl radical or an aralkyl radical having 7 to 20 carbon atoms, preferably a methyl, ethyl, propyl, butyl or pentyl group.

$R^{1'}$ is secondly especially an ethylene, propylene, butylene, methylethylene or 1,2-dimethylethylene group.

$R^{2'}$ is secondly especially an ethylene, propylene, butylene, methylethylene or 1,2-dimethylethylene group.

The two alkylene groups $R^{1'}$ and $R^{2'}$ together with the urea nitrogen atoms form a ring, especially piperazine or 2,3,5,6-tetramethylpiperazine or homopiperazine (1,4-diazacycloheptane).

$R^{3'}$ is especially a monomeric monoisocyanate selected from the group consisting of butyl isocyanate, pentyl isocyanate, hexyl isocyanate, octyl isocyanate, decyl isocyanate and dodecyl isocyanate, and also cyclohexyl isocyanate, methylcyclohexyl isocyanate and benzyl isocyanate.

The accelerators C of the formula (Ia) are readily obtainable synthetically from the reaction of an aliphatic, cycloaliphatic or araliphatic mono-, di-, tri- or tetraisocyanate of the formula (III) with a secondary amine of the formula (IV).

$$R^1[NCO]_n \qquad (III)$$

   (IV)

In a second variant of the synthesis, the accelerator C of the formula (Ia) it is prepared from the reaction of a primary aliphatic, cycloaliphatic or araliphatic amine of the formula (V) and a compound of the formula (VI).

$$R^1[NH_2]_n \qquad (V)$$

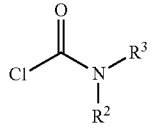   (VI)

The latter variant is advantageous especially when polyisocyanates of the formula (III) are commercially unobtainable or obtainable only with difficulty.

The accelerators C of the formula (Ib) are readily obtainable synthetically from the reaction of an aliphatic, cycloaliphatic or araliphatic monoisocyanate of the formula (111a) with a secondary amine of the formula (IVa) or (IVb).

$$R^{3'}NCO \qquad (IIIa)$$

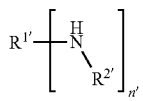   (IVa)

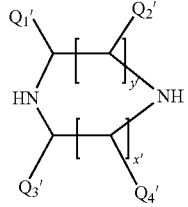   (IVb)

In formula (IVb), x' and y' each independently have the values of 1, 2, 3, 4 or 5, and the substituents $Q^{1'}$, $Q^{2'}$, $Q^{3'}$ and $Q^{4'}$ are each independently H or a $C_1$- to $C_5$-alkyl group. Preferably, x' and y' are 1 or 2, preferably each 1, meaning that the secondary amine of the formula (IVb) is preferably piperazine or 2,3,5,6-tetramethylpiperazine or homopiperazine (1,4-diazacycloheptane), more preferably piperazine or 2,3,5,6-tetramethylpiperazine.

The secondary amines of the formula (IVa) can in turn especially be prepared readily from the alkylation of primary amines of the formula $R^{1'}[NH_2]_{n'}$.

Particularly preferred amines of the formula (IVa) are selected from the group consisting of N,N'-dimethyl-1,2-diaminocyclohexane, N,N'-dimethylethylenediamine, N,N'-dimethylpropane-1,3-diamine, bisisopropylated IPDA (Jefflink-754 (Huntsman)), N,N'-diisobutylethylenediamine and N-ethyl-N'-methylethylenediamine.

Most preferably, the at least one accelerator C is an accelerator of the formula (Ia) where, in particular:
—$R^1$ is H, and $R^2$ and $R^3$ are each a methyl, ethyl or propyl group, preferably each a methyl group, and n=1, and/or
—$R^1$ is

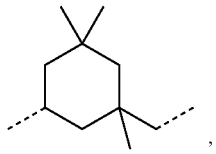

, and $R^2$ and $R^3$ are each a methyl, ethyl or propyl group, preferably each a methyl group, and n=2.

The accelerator C especially has a molecule of less than 1000 g/mol, especially between 80 and 800 g/mol. If the molecular weight is greater, the accelerating effect is reduced and the necessary use amount is significantly higher, which can in turn lead to poor mechanical properties.

The amount of the accelerator C is advantageously 0.01-6.0% by weight, especially 0.02-4.0% by weight, preferably 0.02-2.0% by weight, based on the weight of the epoxy resin A.

The ratio of the proportion of accelerator C in grams per mole of epoxy groups of the epoxy resin A is preferably 0.01-0.5 g/mol of epoxy groups, especially 0.05-0.3 g/mol of epoxy groups, more preferably 0.075-0.2 g/mol of epoxy groups, most preferably 0.08-0.15 g/mol of epoxy groups. This is advantageous in that a high storage stability coupled with simultaneously good mechanical values and good adhesion in the case of curing at temperatures of 130-150° C. is obtained within this range.

The one-component thermosetting epoxy resin composition preferably comprises at least one toughness improver D. The toughness improvers D may be solid or liquid.

More particularly, the toughness improver D is selected from the group consisting of terminally blocked polyurethane polymers D1, liquid rubbers D2 and core-shell polymers D3. The toughness improver D is preferably selected from the group consisting of terminally blocked polyurethane polymers D1 and liquid rubbers D2. Particular preference is given to a terminally blocked polyurethane polymer D1.

If the toughness improver D is a terminally blocked polyurethane prepolymer D1.

It is preferably a terminally blocked polyurethane polymer D1 blocked with a blocking group that is eliminated at a temperature above 100° C.

Preferred blocking groups are especially firstly phenols or bisphenols. Preferred examples of such phenols and bisphenols are especially phenol, cresol, resorcinol, catechol, cardanol (3-pentadecenylphenol (from cashew nut shell oil)), nonylphenol, phenols that have been reacted with styrene or dicyclopentadiene, bisphenol A, bisphenol F and 2,2'-diallylbisphenol A.

The terminally blocked polyurethane prepolymer is prepared from a linear or branched polyurethane prepolymer terminated by isocyanate groups with one or more isocyanate-reactive compounds. If two or more such isocyanate-reactive compounds are used, the reaction can be effected sequentially or with a mixture of these compounds.

The reaction is preferably effected in such a way that the one or more isocyanate-reactive compounds are used stoichiometrically or in a stoichiometric excess in order to ensure that all NCO groups have been converted.

The polyurethane prepolymer with isocyanate end groups can be prepared from at least one diisocyanate or triisocyanate and from a polymer $Q_{PM}$ having terminal amino, thiol or hydroxyl groups and/or from an optionally substituted polyphenol $Q_{PP}$.

Suitable diisocyanates are aliphatic, cycloaliphatic, aromatic or araliphatic diisocyanates, especially commercial products such as methylene diphenyl diisocyanate (MDI), hexamethylene diisocyanate (HDI), toluene diisocyanate (TDI), toluidine diisocyanate (TODD, isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate ($H_{12}MDI$), p-phenylene diisocyanate (PPDI), m-tetramethylxylylene diisocyanate (TMXDI), etc. and dimers thereof. Preference is given to HDI, IPDI, MDI or TDI.

Suitable triisocyanates are trimers or biurets of aliphatic, cycloaliphatic, aromatic or araliphatic diisocyanates, especially the isocyanurates and biurets of the diisocyanates described in the previous paragraph. It is of course also possible to use suitable mixtures of di- or triisocyanates.

Especially suitable polymers $Q_{PM}$ having terminal amino, thiol or hydroxyl groups are polymers $Q_{PM}$ having two or three terminal amino, thiol or hydroxyl groups.

The polymers $Q_{PM}$ advantageously have an equivalent weight of 300-6000, especially of 600-4000, preferably of 700-2200, g/equivalent of NCO-reactive groups.

Preferred polymers $Q_{PM}$ are polyols having average molecular weights between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers and mixtures thereof.

Especially preferred polymers $Q_{PM}$ are α,ω-dihydroxy polyalkylene glycols having $C_2$-$C_6$-alkylene groups or having mixed $C_2$-$C_6$-alkylene groups, terminated by amino, thiol or, preferably, hydroxyl groups. Particular preference is given to polypropylene glycols or polybutylene glycols. Particular preference is further given to hydroxyl group-terminated polyoxybutylenes.

Especially suitable polyphenols $Q_{PP}$ are bis-, tris- and tetraphenols. This is understood to mean not just straight phenols but optionally also substituted phenols. The nature of the substitution may be very varied. More particularly, this is understood to mean substitution directly on the aromatic ring to which the phenolic OH group is bonded. Phenols are additionally understood to mean not just monocyclic aromatics but also polycyclic or fused aromatics or heteroaromatics that have the phenolic OH group directly on the aromatic or heteroaromatic system.

In a preferred embodiment, the polyurethane prepolymer is prepared from at least one diisocyanate or triisocyanate and from a polymer $Q_{PM}$ having terminal amino, thiol or hydroxyl groups. The polyurethane prepolymer is prepared in a manner known to the person skilled in the art of polyurethane, especially by using the diisocyanate or triisocyanate in a stoichiometric excess in relation to the amino, thiol or hydroxyl groups of the polymer $Q_{PM}$.

The polyurethane prepolymer having isocyanate end groups preferably has elastic character. It preferably exhibits a glass transition temperature Tg of less than 0° C.

The toughness improver D may be a liquid rubber D2. This may be, for example, a carboxy- or epoxy-terminated polymer. In a first embodiment, this liquid rubber may be a carboxy- or epoxy-terminated acrylonitrile/butadiene copolymer or derivative thereof. Such liquid rubbers are commercially available, for example, under the Hypro/Hypox® CTBN and CTBNX and ETBN name from Emerald Performance Materials. Suitable derivatives are especially elastomer-modified prepolymers having epoxy groups, as sold commercially under the Polydis® product line, especially from the Polydis® 36. product line, by Struktol® (Schill+ Seilacher Gruppe, Germany) or under the Albipox product line (Evonik, Germany).

In a second embodiment, this liquid rubber may be a polyacrylate liquid rubber which is fully miscible with liquid epoxy resins and separates to form microdroplets only in the course of curing of the epoxy resin matrix. Such polyacrylate liquid rubbers are available, for example, under the 20208-XPA name from Dow.

It is of course also possible to use mixtures of liquid rubbers, especially mixtures of carboxy- or epoxy-terminated acrylonitrile/butadiene copolymers or derivatives thereof.

The toughness improver D, in a third embodiment, may be a core-shell polymer D3. Core-shell polymers consist of an elastic core polymer and a rigid shell polymer. Particularly suitable core-shell polymers consist of a core of elastic acrylate or butadiene polymer encased by a rigid shell of a rigid thermoplastic polymer. This core-shell structure either forms spontaneously as a result of separation of a block copolymer or is defined by the conduct of the polymerization as a latex or suspension polymerization with subsequent grafting. Preferred core-shell polymers are what are called MBS polymers, which are commercially available under the Clearstrength™ trade name from Arkema, Paraloid™ from Dow or F-351™ from Zeon. Preferably, the proportions of the following are:

toughness improver D1 10-60% by weight, especially 20-30% by weight;
toughness improver D2 10-30% by weight, especially 20-30% by weight;
toughness improver D3 10-30% by weight, especially 20-30% by weight;
based on the total weight of the epoxy resin composition.

In a further preferred embodiment, the composition additionally comprises at least one filler F. Preference is given here to mica, talc, kaolin, wollastonite, feldspar, syenite, chlorite, bentonite, montmorillonite, calcium carbonate (precipitated or ground), dolomite, quartz, silicas (fused or precipitated), cristobalite, calcium oxide, aluminum hydroxide, magnesium oxide, hollow ceramic beads, hollow glass beads, hollow organic beads, glass beads, color pigments. Particular preference is given to fillers selected from the group consisting of calcium carbonate, calcium oxide and fumed silicas.

Advantageously, the total proportion of the overall filler F is 5-40% by weight, preferably 10-30% by weight, based on the total weight of the epoxy resin composition.

In a further preferred embodiment, the composition may comprise a physical or chemical blowing agent as obtainable, for example, under the Expancel™ trade name from Akzo Nobel or Celogen™ from Chemtura or under the Luvopor® trade name from Lehmann & Voss. The proportion of the blowing agent is advantageously 0.1-3% by weight, based on the total weight of the epoxy resin composition.

In a further preferred embodiment, the composition additionally comprises at least one epoxy-bearing reactive diluent G. Such reactive diluents are known to the person skilled in the art. Preferred examples of epoxy-bearing reactive diluents are:

glycidyl ethers of monofunctional, saturated or unsaturated, branched or unbranched, cyclic or open-chain, $C_4$-$C_{30}$ alcohols, e.g. butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether, and the like;

glycidyl ethers of difunctional, saturated or unsaturated, branched or unbranched, cyclic or open-chain, $C_2$-$C_{30}$ alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, and the like;

glycidyl ethers of tri- or polyfunctional, saturated or unsaturated, branched or unbranched, cyclic or open-chain, alcohols, such as epoxidized castor oil, epoxidized trimethylolpropane, epoxidized pentaerythritol or polyglycidyl ethers of aliphatic polyols, such as sorbitol, glycerol, trimethylolpropane, and the like;

glycidyl ethers of phenol compounds and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline, and the like;

epoxidized amines, such as N,N-diglycidylcyclohexylamine, and the like;

epoxidized mono- or dicarboxylic acids, such as glycidyl neodecanoate, glycidyl methacrylate, glycidyl benzoate, diglycidyl phthalate, tetrahydrophthalate and hexahydrophthalate, diglycidyl esters of dimeric fatty acids, and the like;

epoxidized di- or trifunctional, low to high molecular weight polyether polyols, such as polyethylene glycol diglycidyl ether, polypropylene glycol diglycidyl ether, and the like.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the epoxy-bearing reactive diluent G is 0.1-15% by weight, preferably 0.1-5% by weight, especially preferably 0.1-2% by weight, more preferably 0.2-1% by weight, based on the total weight of the epoxy resin composition.

The composition may include further constituents, especially catalysts, stabilizers, especially heat and/or light stabilizers, thixotropic agents, plasticizers, solvents, mineral or organic fillers, blowing agents, dyes and pigments, anticorrosives, surfactants, defoamers and adhesion promoters.

Suitable plasticizers are especially phenol alkylsulfonates or N-butylbenzamide, as commercially available as Mesamoll® or Dellatol BBS from Bayer.

Suitable stabilizers are especially optionally substituted phenols such as BHT or Wingstay® T (Elkem), sterically hindered amines or N-oxyl compounds such as TEMPO (Evonik).

A particularly preferred one-component epoxy resin composition comprises:

10-60% by weight, especially 30-50% by weight, based on the total weight of the epoxy resin composition, of epoxy resin A having an average of more than one epoxy group per molecule; preferably 50-100% by weight, especially 80-100% by weight, of the epoxy resin A is a liquid epoxy resin and 0-30% by weight, especially 0-20% by weight, more preferably 5-15% by weight, of the epoxy resin A is a solid epoxy resin;
curing agent B, preferably adipic dihydrazide;
at least one accelerator C of the formula (Ia) or (Ib), especially of the formula (Ia), where, in particular:
$R^1$ is H, and $R^2$ and $R^3$ are each a methyl, ethyl or propyl group, preferably each a methyl group, and n=1, and/or $R^1$ is

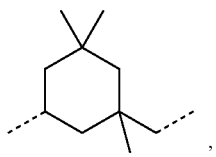

and $R^2$ and $R^3$ are each a methyl, ethyl or propyl group, preferably each a methyl group, and n=2;
preferably at least one toughness improver D selected from the group consisting of terminally blocked polyurethane polymers D1, liquid rubbers D2 and core-shell polymers D3, where the proportions are preferably as follows:
toughness improver D1 10-60% by weight, especially 20-30% by weight;
toughness improver D2 10-30% by weight, especially 20-30% by weight;
toughness improver D3 10-30% by weight, especially 20-30% by weight;
based on the total weight of the epoxy resin composition;
preferably 5-50% by weight, preferably 10-30% by weight, based on the total weight of the epoxy resin composition, of a filler F selected from the group consisting of calcium carbonate, calcium oxide and fumed silicas;
preferably 0.1-15% by weight, preferably 0.1-5% by weight, especially preferably 0.1-2% by weight, more preferably 0.2-1% by weight, based on the total weight of the epoxy resin composition, of an epoxy-bearing reactive diluent G.

The ratio of the proportion of accelerator C in grams per mole of epoxy groups of the epoxy resin A is preferably 0.01-0.5 g/mol of epoxy groups, especially 0.05-0.3 g/mol of epoxy groups, more preferably 0.075-0.2 g/mol of epoxy groups, most preferably 0.08-0.15 g/mol of epoxy groups.

The ratio of the proportion of epoxy groups of the epoxy resin A in mol/proportion of dihydrazide in mol is preferably 3-5, especially 3.5-4.5.

It may further be advantageous when the preferred one-component epoxy resin composition consists of the aforementioned constituents to an extent of more than 80% by weight, preferably more than 90% by weight, especially more than 95% by weight, especially preferably more than 98% by weight, most preferably more than 99% by weight, based on the total weight of the epoxy resin composition.

An example of a particularly preferred composition is E1 in table 1.

It is advantageous when the epoxy resin composition of the invention has a viscosity at 25° C. of 500-3000 Pa*s, especially 1000-2500 Pa*s, preferably 1000-2000 Pa*s. This is advantageous in that this assures good applicability.

It is also advantageous when, in the epoxy resin composition of the invention, the viscosity measured at a measurement temperature of 25° C., after storage for 1 week at 60° C. one day after production, rises by less than 500%, by less than 300%, by less than 200%, less than 150%, less than 120%, less than 100%, less than 50%.

It has been found that the thermosetting epoxy resin compositions described are particularly suitable for use as one-component thermosetting adhesives, especially as a thermosetting one-component bodywork adhesive in motor vehicle construction. Such a one-component adhesive has a range of possible uses. Such adhesives are required for the adhesive bonding of heat-stable materials. Heat-stable materials are understood to mean materials that are dimensionally stable at least during the curing time at a curing temperature of 100-220° C., preferably 120-200° C. In particular, these are metals and plastics, such as ABS, polyamide, polyphenylene ether, composite materials, such as SMC, unsaturated polyesters GFP, epoxy or acrylate composite materials. Preference is given to the use in which at least one material is a metal. A particularly preferred use is considered to be the bonding of identical or different metals, especially in bodywork construction in the automobile industry. The preferred metals are in particular steel, especially electrolytically galvanized, hot-dip-galvanized or oiled steel, Bonazinc-coated steel, and post-phosphated steel, and also aluminum, especially in the variants which typically occur in automobile construction.

An adhesive based on a thermosetting composition of the invention makes it possible to achieve the desired combination of high crash strength and low curing temperature.

Such an adhesive is especially contacted first with the materials to be bonded at a temperature of between 10° C. and 80° C., especially between 10° C. and 60° C., and later cured at a temperature of typically 130-220° C., preferably 130-180° C., more preferably 130-150° C.

A further aspect of the present invention relates to a process for the bonding of heat-stable substrates, which comprises the stages:
i) applying a thermosetting epoxy resin composition as described in detail above to the surface of a heat-stable substrate S1, especially of a metal;
ii) contacting the thermosetting epoxy resin composition applied with the surface of a further heat-stable substrate S2, especially of a metal;
iii) heating the composition to a temperature of 100-220° C., especially of 120-200° C., preferably between 130 and 150° C., more preferably between 130 and 140° C.

The substrate S2 consists here of the same material as or a different material from the substrate S1.

The substrates S1 and/or S2 are in particular the aforementioned metals and plastics.

Preferably, in step iii) heating the composition to a temperature of 100-220° C., especially of 120-200° C., preferably between 130 and 150° C., more preferably between 130 and 140° C., the composition is left at the aforementioned temperature for 10 min-6 h, 10 min-2 h, 10 min-60 min, 10 min-30 min, 10 min-20 min, more preferably 10 min-15 min.

Such a method of bonding heat-stable materials results in an adhesive-bonded article. Such an article is preferably a vehicle or part of a vehicle.

A further aspect of the present invention accordingly relates to an adhesive-bonded article obtained from the abovementioned process. It is of course possible to use a composition of the invention to realize not only thermosetting adhesives but also sealing compounds. Furthermore, the compositions according to the invention are suitable not only for automobile construction but also for other fields of use. Particular mention should be made of related applications in the construction of transportation means, such as ships, trucks, buses or rail vehicles, or in the construction of consumer goods, such as, for example, washing machines.

The materials adhesive-bonded by means of a composition according to the invention are used at temperatures between typically 120° C. and −40° C., preferably between 100° C. and −40° C., in particular between 80° C. and −40° C.

A particularly preferred use of the thermosetting epoxy resin composition of the invention is the use thereof as a thermosetting one-component bodywork adhesive in motor vehicle construction or as a stiffening compound or as a foamable, thermosetting composition for the reinforcement of voids in structural components and reinforcing elements.

A further aspect of the present invention relates to a cured epoxy resin composition as obtained by heating a thermosetting epoxy resin composition as described in detail above. The heating is typically effected in an oven at a temperature of 100-220° C., preferably between 130 and 150° C., more preferably between 130 and 140° C., preferably for 10 min-6 h, 10 min-2 h, 10 min-60 min, 10 min-30 min, 10 min-20 min, more preferably 10 min-15 min, at the aforementioned temperature.

It has been found that accelerators C of the invention as already described in detail above as a constituent of a thermosetting epoxy resin composition are suitable in combination with the curing agents B of the invention as accelerators for thermosetting epoxy resin compositions at curing temperatures especially between 130 and 150° C.

It has been found that, surprisingly, other accelerators for thermosetting epoxy resin compositions do not meet the requirement of acceleration at low temperatures with simultaneous storage stability. For example, it is apparent in table 2 that when diuron or 1,1'-(methylenebis(4,1-phenylene))bis (3,3-dimethylurea) is used, for example, the storage stability of the corresponding epoxy resin composition has deteriorated after one week at 60° C. to such an extent that the compositions cure. This is apparent, for example, in the comparison of E1 and E2 with R2 and R3.

It was particularly surprising that the comparative composition R1 without accelerator has a greater increase in viscosity after one week at 60° C. than compositions E1 and E2 comprising an accelerator C.

It is further apparent from the comparison of compositions E1 and E2 with compositions R4-R8 in table 2 that the comparative composition containing solely dicyandiamide as curing agent does not cure under the curing conditions for the measurement of lap shear strength at 140° C. for 10 min, and is therefore unsuitable for use either without or with accelerator.

EXAMPLES

Some examples which further illustrate the invention, but which are not intended to restrict the scope of the invention in any way, are cited below.

Preparation of a Toughness Improver ("D-1")

150 g of poly-THF 2000 (OH number 57 mg/g KOH) and 150 of Liquiflex H (OH number 46 mg/g KOH) were dried under vacuum at 105° C. for 30 minutes. Once the temperature had been reduced to 90° C., 61.5 g of IPDI and 0.14 g of dibutyltin dilaurate were added. The reaction was carried out under vacuum at 90° C. until the NCO content was constant at 3.10% after 2.0 h (calculated NCO content: 3.15%). Subsequently, 96.1 g of cardanol were added as blocking agent. Stirring was continued at 105° C. under vacuum until it was no longer possible to detect any free NCO. The product was used as such as toughness improver D-1.

| | |
|---|---|
| A-Liquid resin | liquid epoxy resin, D.E.R. 331 (bisphenol A diglycidyl ether), Dow |
| A-Solid resin | solid epoxy resin (bisphenol A diglycidyl ether-based), Dow |
| B1 | adipic dihydrazide, Technicure ADH-J (median particle size $D_{50}$ of 2.4 µm), A&C Catalysts Inc. |
| B2 | adipic dihydrazide, Technicure ADH (median particle size $D_{50}$ of 15 µm), A&C Catalysts Inc. |
| B3 | adipic dihydrazide, ESIM ADH (median particle size $D_{50}$ of 18 µm), ESIM Chemicals |
| B4 | adipic dihydrazide, Innochem ADH (median particle size $D_{50}$ of 22 µm), Innochem |
| B5 | adipic dihydrazide, Harke ADH (median particle size $D_{50}$ of 32.5 µm), Harke |
| B6 | adipic dihydrazide, Novasol ADH (median particle size $D_{50}$ of 42 µm), Novasol Chemie GmbH |
| C1 | N,N-dimethylurea (=1,1-dimethylurea), n = 1, $R^1$ = H, $R^2$ = $R^3$ = $CH_3$, Sigma-Aldrich, Switzerland |
| C2 | 3-(5-(3,3-dimethylureido)-1,3,3-trimethylcyclohexyl)-N,N-dimethylpropanamide (=Dyhard UR800), n = 2, $R^1$ = $R^2$ = $R^3$ = $CH_3$ |
| C3 | diuron, (3-(3,4-dichlorophenyl)-1,1-dimethylurea, Sigma-Aldrich, Switzerland |
| C4 | 1,1'-(methylenebis(4,1-phenylene))bis(3,3-dimethylurea) |
| Dicy | dicyandiamide, Dyhard 100 SF (median particle size $D_{50}$ of 2-3 µm), AlzChem |
| Filler | Mixture of calcium carbonate, calcium oxide, fumed silica Poly-THF 2000 (difunctional polybutylene glycol) (OH equivalent weight = about 1000 g/OH equivalent), BASF Liquiflex H (hydroxyl-terminated polybutadiene) (OH equivalent weight = about 1230 g/OH equivalent), Krahn Isophorone diisocyanate (="IPDI"), Evonik Cardolite NC-700 (cardanol, meta-substituted alkenylmonophenol), Cardolite |

Raw materials used.

Production of the Compositions

The reference compositions R1-R8 and the inventive compositions E1 to E8 were produced according to the figures in table 1. The stated amounts in table 1 are in parts by weight.

The ratio of the proportion of epoxy groups of the epoxy resin A in mol/proportion of dihydrazide in mol is called "B index" in table 1 and reported in [mol of EP groups/mol of dihydrazide].

The ratio of the proportion of accelerator C in grams per mole of epoxy groups of the epoxy resin A is called "C index" in table 1 and reported in [g of accelerator/mol of EP groups].

Test Methods:

Modulus of Elasticity (DIN EN ISO 527)

An adhesive sample was pressed between two Teflon papers to a layer thickness of 2 mm. After curing at 175° C. for 35 min, the Teflon papers were removed and the specimens were die-cut to the DIN standard state. The test specimens were examined under standard climatic conditions at a strain rate of 2 mm/min. 0.05-0.25% modulus of elasticity was determined to DIN EN ISO 527.

Lap Shear Strength (ZSF) (DIN EN 1465)

Cleaned test specimens of Elo H420 steel (thickness 1.5 mm) that had been reoiled with Anticorit PL 3802-39S were bonded with the adhesive over a bonding area of 25×10 mm with glass beads as spacer in a layer thickness of 0.3 mm, and cured at oven temperature 140° C. for 10 min.

Lap shear strength was determined on a tensile tester at a strain rate of 10 mm/min in a triple determination to DIN EN 1465.

Impact Peel Strength (IP RT) (to ISO 11343)

The specimens were produced with the adhesive and DC04+ZE steel with dimensions of 90×20 x 0.8 mm. The bonding area here was 20×30 mm at a layer thickness of 0.3 mm with glass beads as spacer. The samples were cured for 10 minutes at oven temperature 140° C. Impact peel strength was measured at 23° C. as a triple determination on a Zwick 450 impact pendulum. The impact peel strength reported is the average force in N/mm under the measurement curve from 25% to 90% to ISO11343.

Viscosity/Storage Stability of Adhesives

Viscosity measurements of the adhesives were effected 1 d after production on an Anton Paar MCR 101 rheometer by oscillation using a plate-plate geometry at a temperature of 25° C. with the following parameters: 5 Hz, 1 mm gap, plate diameter 25 mm, 1% deformation. The measurement is displayed in table 2 under "Visco initial 25° C.".

For assessment of the storage stability of the adhesives, the viscosity measurement was repeated after storage at the specified temperature for a specified time in weeks, and the percentage rise in viscosity that results after the storage was ascertained. The measured viscosity in Pa*s measured at a temperature of 25° C. after storage for 1 week at 50° C. and 60° C. is displayed in table 2 under "Visco 1W 50 25° C." and "Visco 1W 60 25° C." respectively. The value between parentheses shows the percentage rise in viscosity.

TABLE 1

|  | R1 | E1 | E2 | R2 | R3 | R4 | R5 | R6 | R7 |
|---|---|---|---|---|---|---|---|---|---|
| A-Liquid resin | 32.5 | 32.5 | 32.5 | 32.5 | 32.5 | 32.5 | 32.5 | 32.5 | 32.5 |
| A-Solid resin | 4.5 | 4.5 | 4.5 | 4.5 | 4.5 | 4.5 | 4.5 | 4.5 | 4.5 |
| D1 Dicy | 12.00 | 12.00 | 12.00 | 12.00 | 12.00 | 12.00 | 12.00 | 12.00 | 12.00 |
|  |  |  |  |  |  | 2.87 | 2.87 | 2.87 | 2.87 |
| C1 |  | 0.02 |  |  |  |  | 0.02 |  |  |
| C2 |  |  | 0.01 |  |  |  |  | 0.01 |  |
| C3 |  |  |  | 0.02 |  |  |  |  | 0.02 |
| C4 |  |  |  |  | 0.01 |  |  |  |  |
| B1 | 8.19 | 8.19 | 8.19 | 8.19 | 8.19 |  |  |  |  |
| B2 |  |  |  |  |  |  |  |  |  |
| B3 |  |  |  |  |  |  |  |  |  |
| B4 |  |  |  |  |  |  |  |  |  |
| B5 |  |  |  |  |  |  |  |  |  |
| B6 |  |  |  |  |  |  |  |  |  |
| Fillers | 44.54 | 44.54 | 44.54 | 44.54 | 44.54 | 44.54 | 44.54 | 44.54 | 44.54 |
| Sum: | 101.73 | 101.754 | 101.744 | 101.754 | 101.744 | 96.41 | 96.43 | 96.42 | 96.43 |
| B index |  |  |  |  |  |  |  |  |  |
| C index |  | 0.1 | 0.05 | 0.1 | 0.05 |  | 0.1 | 0.05 | 0.1 |

|  | R8 | E3 | E1 | E4 | E5 | E6 | E7 | E8 |
|---|---|---|---|---|---|---|---|---|
| A-Liquid resin | 32.5 | 32.5 | 32.5 | 32.5 | 32.5 | 32.5 | 32.5 | 32.5 |
| A-Solid resin | 4.5 | 4.5 | 4.5 | 4.5 | 4.5 | 4.5 | 4.5 | 4.5 |
| D1 Dicy | 12.00 | 12.00 | 12.00 | 12.00 | 12.00 | 12.00 | 12.00 | 12.00 |
|  | 2.87 | 1.44 |  |  |  |  |  |  |
| C1 |  | 0.02 | 0.02 | 0.02 | 0.02 | 0.02 | 0.02 | 0.02 |
| C2 |  |  |  |  |  |  |  |  |
| C3 |  |  |  |  |  |  |  |  |
| C4 | 0.01 |  |  |  |  |  |  |  |
| B1 |  |  | 8.19 |  |  |  |  |  |
| B2 |  | 4.10 |  | 8.19 |  |  |  |  |
| B3 |  |  |  |  | 8.19 |  |  |  |
| B4 |  |  |  |  |  | 8.19 |  |  |

TABLE 1-continued

| | | | | | | | | | |
|---|---|---|---|---|---|---|---|---|---|
| B5 | | | | | | | | 8.19 | |
| B6 | | | | | | | | | 8.19 |
| Fillers | 44.54 | 44.54 | 44.54 | 44.54 | 44.54 | 44.54 | 44.54 | 44.54 | 44.54 |
| Sum: | 96.42 | 99.10 | 101.75 | 101.75 | 101.75 | 101.75 | 101.75 | 101.75 | 101.75 |
| B index | | 2 | 4 | 4 | 4 | 4 | 4 | 4 | 4 |
| C index | 0.05 | 0.1 | 0.1 | 0.1 | 0.1 | 0.1 | 0.1 | 0.1 | 0.1 |

TABLE 2

| | R1 | E1 | E2 | R2 | R3 | R4 | R5 | R6 | R7 | R8 | E3 | E1 | E4 | E5 | E6 | E7 | E8 |
|---|---|---|---|---|---|---|---|---|---|---|---|---|---|---|---|---|---|
| Modulus of elasticity (35' 175° C.) | 3470 | 3430 | 3450 | 3570 | 3640 | n.d. | n.d. | n.d. | n.d. | n.d. | 3720 | | | | | | |
| LSS (10' 140° C.) | 13.7 ± 1.3 | 21.4 ± 0.5 | 17.3 ± 0.6 | 24.2 ± 0.5 | 20.2 ± 0.9 | n.c. | n.c. | n.c. | n.c. | n.c. | 19.0 ± 1.2 | 21.4 ± 0.5 | 19.5 ± 0.7 | 18.1 ± 0.5 | 19.2 ± 0.4 | 17.5 ± 0.8 | 12.7 ± 1.7 |
| IP RT (10' 140° C.) | 1.4 ± 1.8 | 8.7 ± 1.2 | 4.3 ± 1.3 | 9.5 ± 0.1 | 9.8 ± 0.2 | n.c. | n.c. | n.c. | n.c. | n.c. | 5.2 ± 0.4 | | | | | | |
| Visco initial 25° C. | 1890 | 2790 | 1900 | 1940 | 2110 | n.d. | n.d. | n.d. | n.d. | n.d. | 2370 | 2790 | 2110 | 2110 | 2120 | 2250 | 2430 |
| Visco 1W 50 25° C. | 2160 (+14) | 2610 (−6) | 2240 (+18) | 2710 (+40) | 2840 (+35) | n.d. | n.d. | n.d. | n.d. | n.d. | 2590 (+9) | 2610 (−6) | 2500 (+18) | 2600 (+23) | 2700 (+27) | 2500 (+11) | 2650 (+9) |
| Visco 1W60 25° C. | 4450 (+135) | 4070 (+46) | 3520 (+85) | c. | c. | n.d. | n.d. | n.d. | n.d. | n.d. | 5340 (+125) | 4070 (+46) | 7470 (+254) | 4610 (+118) | 10700 (+405) | 8990 (+300) | 5310 (+119) | n.c. = not cured
c. = cured
n.d. = not determined

The invention claimed is:

1. A thermosetting epoxy resin composition comprising
a) at least one epoxy resin A having an average of more than one epoxy group per molecule;
b) at least one curing agent B for epoxy resins, where the curing agent B is a dihydrazide selected from the group consisting of glutaric dihydrazide, adipic dihydrazide and pimelic dihydrazide; and
c) at least one accelerator C of the formula (Ia) or (Ib)

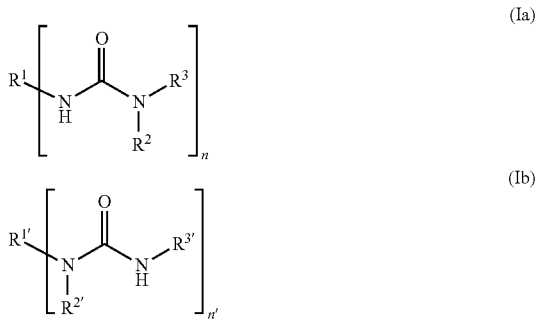

where $R^1$ is H or an n-valent aliphatic, cycloaliphatic or araliphatic radical;
$R^2$ and $R^3$ are
either
 each independently an alkyl group or aralkyl group;
or
 together are a divalent aliphatic radical which has 3 to 20 carbon atoms and is part of an optionally substituted heterocyclic ring having 5 to 8 ring atoms;
$R^{1'}$ is an n'-valent aliphatic, cycloaliphatic or araliphatic radical;
$R^{2'}$ is an alkyl group or aralkyl group or alkylene group;
$R^{3'}$ is independently H or an alkyl group or aralkyl group; and
n and n' each have a value of 1 to 4,
 wherein when $R^1$ is not H, $R^1$ does not include an aromatic group bonded directly to a nitrogen atom of Formula (Ia),
 wherein a ratio of a proportion of epoxy groups of the epoxy resin A in a mol/a proportion of dihydrazide in mol is 3-5,
 wherein a ratio of a proportion of accelerator C in grams per mole of epoxy groups of the epoxy resin A is 0.08-0.15 g/mol of epoxy groups, and
 wherein the epoxy resin composition has a viscosity at 25° C. of 500 to 3000 Pa*s.

2. The thermosetting epoxy resin composition as claimed in claim 1, wherein $R^1$ is H, and $R^2$ and $R^3$ are each a methyl, ethyl or propyl group, and n=1.

3. The thermosetting epoxy resin composition as claimed in claim 1, wherein $R^1$ is

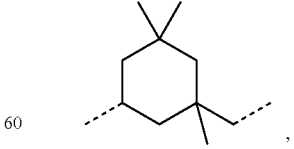

and $R^2$ and $R^3$ are each a methyl, ethyl or propyl group, and n=2.

4. The thermosetting epoxy resin composition as claimed in claim 1, wherein the dihydrazide has a median particle size $D_{50}$ of ≤100 μm.

5. The thermosetting epoxy resin composition as claimed in claim 1, wherein the thermosetting epoxy resin composition includes less than 0.5% by weight, based on the total weight of the epoxy resin composition, of dicyandiamide.

6. The thermosetting epoxy resin composition as claimed in claim 1, wherein the thermosetting epoxy resin composition additionally includes at least one toughness improver D selected from the group consisting of terminally blocked polyurethane polymers D1, liquid rubbers D2 and core-shell polymers D3.

7. The thermosetting epoxy resin composition as claimed in claim 1, wherein the proportion of the epoxy resin A is 10-60% by weight, based on the total weight of the epoxy resin composition.

8. The thermosetting epoxy resin composition as claimed in claim 1, wherein the thermosetting epoxy resin composition is a one-component thermosetting adhesive.

9. A process for the adhesive bonding of heat-stable substrates, comprising the stages of:
   i) applying a thermosetting epoxy resin composition as claimed in claim 1 to the surface of a heat-stable substrate S1;
   ii) contacting the thermosetting epoxy resin composition applied with the surface of a further heat-stable substrate S2;
   iii) heating the composition to a temperature of 100-220° C.;
   in which the substrate S2 consists of the same material as or a different material from the substrate S1.

10. The process as claimed in claim 9, wherein, in step iii) of heating the composition to a temperature of 100-220° C., the composition is left at the aforementioned temperature for 10 min-6 h.

11. An adhesive-bonded article obtained from a process as claimed in claim 9.

12. The thermosetting epoxy resin composition as claimed in claim 1, wherein the epoxy resin A is of formula (II):

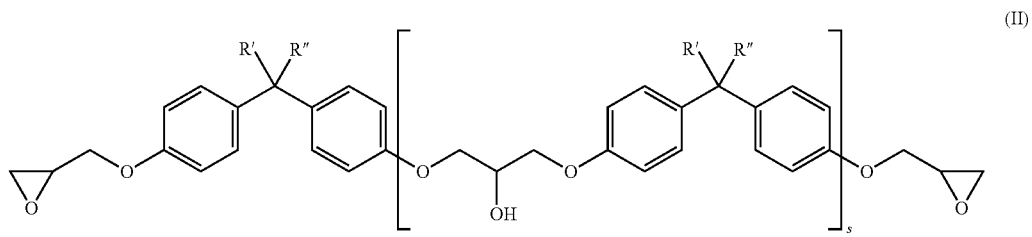

wherein R' and R" are independently either H or $CH_3$ and s has a value of >1.5.

13. The thermosetting epoxy resin composition as claimed in claim 12, wherein s has a value of 2 to 12.

14. The thermosetting epoxy resin composition as claimed in claim 1, wherein a viscosity of the thermosetting epoxy resin composition measured at 25° C., after storage for 1 week at 60° C. starting after production, rises by less than 500%.

* * * * *